United States Patent
Sundberg et al.

(10) Patent No.: US 11,178,631 B2
(45) Date of Patent: Nov. 16, 2021

(54) TA DEPENDENT HARQ FEEDBACK/UL GRANT TIMING DETERMINATION

(71) Applicant: Telefonaktiebolaget LM Ericsson (publ), Stockholm (SE)

(72) Inventors: Mårten Sundberg, Årsta (SE); Daniel Chen Larsson, Lund (SE); Laetitia Falconetti, Järfälla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 100 days.

(21) Appl. No.: 16/464,425

(22) PCT Filed: Nov. 28, 2016

(86) PCT No.: PCT/EP2016/079056
§ 371 (c)(1),
(2) Date: May 28, 2019

(87) PCT Pub. No.: WO2018/095555
PCT Pub. Date: May 31, 2018

(65) Prior Publication Data
US 2020/0344710 A1    Oct. 29, 2020

(51) Int. Cl.
*H04W 56/00* (2009.01)
(52) U.S. Cl.
CPC .............. *H04W 56/0045* (2013.01)
(58) Field of Classification Search
CPC ... H04L 1/1861; H04L 1/1887; H04L 1/1896; H04L 1/18; H04L 1/16; H04W 56/0045; H04W 74/0833; H04W 56/00; H04W 74/08; H04W 28/04; H04W 72/04
See application file for complete search history.

(56) References Cited

U.S. PATENT DOCUMENTS

| | | | | |
|---|---|---|---|---|
| 10,652,894 | B2* | 5/2020 | Hosseini | H04W 72/085 |
| 2012/0057547 | A1* | 3/2012 | Lohr | H04L 5/0064 |
| | | | | 370/329 |
| 2012/0155310 | A1* | 6/2012 | Kreuzer | H04W 52/262 |
| | | | | 370/252 |

(Continued)

FOREIGN PATENT DOCUMENTS

| | | |
|---|---|---|
| CN | 101841778 A | 9/2010 |
| CN | 102348997 A | 2/2012 |

(Continued)

OTHER PUBLICATIONS

International Search Report and Written Opinion dated Jul. 20, 2017, for International Application No. PCTEP2016/079056 filed on Nov. 28, 2016, consisting of 8-pages.

(Continued)

*Primary Examiner* — Nathan S Taylor
(74) *Attorney, Agent, or Firm* — Christopher & Weisberg, P.A.

(57) ABSTRACT

There is disclosed a method for operating a user equipment in a cellular communication network. The method includes processing uplink, UL, signaling based on a processing timing. The processing timing is based on a timing advance value and a determined processing duration value in which the determined processing duration value is based on the timing advance value. The disclosure also pertains to related devices and methods.

17 Claims, 16 Drawing Sheets

(56) References Cited

U.S. PATENT DOCUMENTS

| | | | | |
|---|---|---|---|---|
| 2013/0156018 A1* | 6/2013 | Kim | .................. | H04W 56/0045 370/338 |
| 2014/0071961 A1* | 3/2014 | Nigam | .................. | H04W 72/04 370/336 |
| 2014/0241237 A1* | 8/2014 | Speight | .................. | H04W 52/46 370/315 |
| 2015/0036666 A1* | 2/2015 | Blankenship | ..... | H04W 56/0045 370/336 |
| 2015/0334707 A1* | 11/2015 | Rajagopalan | ...... | H04B 7/18506 370/280 |
| 2016/0142898 A1* | 5/2016 | Poitau | .................. | H04W 76/14 370/329 |
| 2016/0316436 A1* | 10/2016 | Dinan | ............... | H04W 74/0833 |
| 2016/0323070 A1* | 11/2016 | Chen | .................... | H04L 1/1887 |
| 2016/0345316 A1* | 11/2016 | Kazmi | ................. | H04W 74/0833 |
| 2017/0013584 A1* | 1/2017 | Banin | .................. | H04W 4/023 |
| 2017/0111160 A1* | 4/2017 | Chen | .................... | H04L 5/0048 |
| 2017/0181182 A1* | 6/2017 | Patel | .................. | H04W 72/1268 |
| 2018/0131547 A1* | 5/2018 | Wang | ................... | H04L 5/0094 |
| 2018/0332605 A1* | 11/2018 | Pelletier | ............ | H04W 72/1242 |
| 2018/0359772 A1* | 12/2018 | Park | .................. | H04W 72/1268 |
| 2020/0037186 A1* | 1/2020 | Thangarasa | ........... | H04W 24/10 |
| 2020/0329447 A1* | 10/2020 | Siomina | .............. | H04W 56/003 |

FOREIGN PATENT DOCUMENTS

| | | |
|---|---|---|
| CN | 104115535 A | 10/2014 |
| CN | 105519211 A | 4/2016 |
| CN | 105532054 A | 4/2016 |
| WO | 2016106676 A1 | 7/2016 |

OTHER PUBLICATIONS

Chinese Office Action and English Translation dated Dec. 30, 2020 for Application No. 201680091902.8, consisting of 15-pages.

* cited by examiner

| | | | |
|---|---|---|---|
| 00 | $0.00 \leq$ assigned TA $\leq 0.09$ ms | 00 | N+4 |
| 01 | $0.09 <$ assigned TA $\leq 0.28$ ms | 01 | N+5 |
| 10 | $0.28 <$ assigned TA $\leq 0.40$ ms | 10 | N+6 |
| 11 | Reserved | 11 | Reserved |

Fig. 13

| | UE cap A | UE cap B |
|---|---|---|
| 00 | N+4 (0.00 ≤ assigned TA ≤ 0.09 ms) | N+3 (0.00 ≤ assigned TA ≤ 0.12 ms) |
| 01 | N+5 (0.09 < assigned TA ≤ 0.28 ms) | N+4 (0.12 < assigned TA ≤ 0.32 ms) |
| 10 | N+6 (0.28 < assigned TA ≤ 0.40 ms) | N+5 (0.32 < assigned TA ≤ 0.40 ms) |
| 11 | Reserved | Reserved |

Fig. 14

TA DEPENDENT HARQ FEEDBACK/UL GRANT TIMING DETERMINATION

CROSS-REFERENCE TO RELATED APPLICATIONS

This application is a Submission Under 35 U.S.C. § 371 for U.S. National Stage Patent Application of International Application Number: PCT/EP2016/079056, filed Nov. 28, 2016 entitled "TA DEPENDENT HARQ FEEDBACK/UL GRANT TIMING DETERMINATION," the entirety of which is incorporated herein by reference.

TECHNICAL FIELD

This disclosure pertains to wireless communication technology, in particular to cellular communication technology.

BACKGROUND

The introduction of new ideas and use cases for cellular communication provide new challenges for cellular communication systems. A particularly sensitive issue is related to timing of transmissions, in particular in the uplink. With the introduction of more flexibility, e.g. short TTIs, ensuring reliable timing may become more complicated.

SUMMARY

It is an object of the present disclosure to provide approaches facilitating reliable but flexible timing for cellular communication.

There is disclosed a method for operating a user equipment (and/or terminal) in a cellular communication network. The method comprises processing uplink, UL, signaling based on a processing timing, wherein the processing timing is based on a timing advance value and a determined processing duration value, wherein the determined processing duration value is based on the timing advance value.

A user equipment (and/or terminal) for a cellular communication network may be considered. The user equipment is adapted for processing UL signaling based on a processing timing, wherein the processing timing is based on a timing advance value and a determined processing duration value, wherein the determined processing duration value is based on the timing advance value.

There is also considered a method for operating a radio node in a cellular communication network. The method comprises receiving uplink, UL, signaling based on a processing timing, wherein the processing timing is based on a timing advance value and a determined processing duration value, wherein the determined processing duration value is based on the timing advance value.

Furthermore, there may be considered a radio node for a cellular communication network, the radio node being adapted for receiving uplink, UL, signaling based on a processing timing, wherein the processing timing is based on a timing advance value and a determined processing duration value, wherein the determined processing duration value is based on the timing advance value.

Accordingly, the processing timing may accommodate different timing scenarios, allowing greater flexibility, e.g. in the context of short TTIs.

Processing may generally comprise transmitting the uplink signaling, and/or so preparing and/or determining the uplink signaling, e.g. measuring and/or preparing measurement reporting, and/or decoding and/or demodulating DL signaling (e.g., for HARQ). Processing may comprise determining and/or scheduling the UL signaling for transmission at a determined time, e.g. the processing timing. The processing timing may in particular represent and/or define and/or indicate and/or be the time of transmission of the uplink signaling to which the processing time pertains. Processing timing may represent and/or indicate the end point in time of a time interval used for processing the uplink signaling for transmission; the time interval, e.g. duration and/or begin thereof, may be represented and/or indicated by the processing timing.

UL signaling may generally comprise and/or represent UL transmission/s. In particular, UL signaling may comprise transmitting using a short TTI, e.g. comprising 7 or less than 7, e.g. 6, or 5 or 4 or 3 or 2 symbols, e.g. SC-FDMA or OFDMA symbols.

Receiving UL signaling may comprise receiving from a terminal. It may be considered that receiving UL signaling is based on a processing timing, which may indicate at which point in time the UL signaling is expected, and/or receiving UL signaling may comprise associating UL signaling to a signaling process and/or terminal or UE based on the processing timing. It may be noted that processing timing for a radio node may be shifted in time from processing timing for a terminal or UE, due to signal traveling time of the UL signaling.

A timing advance value (TA value) may indicate a shift in transmission timing for a terminal or UE, e.g. based on distance to a radio node and/or to synchronize UL signaling or transmissions from different terminals or UEs. A TA value may be terminal-specific, and/or configure by a radio node. A timing advance value may be indicated and/or configured based on a table index and/or for a range and/or a absolute value, e.g. a time difference. The larger the TA or TA value, the earlier the so UL signaling or transmission may be.

A processing duration value may represent and/or indicate a time interval after which a UL transmission has to be transmitted, e.g., based on a related received DL transmission, which may configure and/or schedule the UL signaling, and/or to which uplink control information pertains. A processing duration value may indicate a number (e.g., integer number) of TTIs and/or subframes. The processing duration value may have different values depending on the TA value.

It may be considered that the processing timing is determined based on a sum of a timing advance value and the processing duration value, and/or associated times or time intervals. In general, the processing timing may be determined based on a TTI length, in particular the number of symbols in the TTI. The TTI may be the TTI for the UL signaling. For different TTIs (different in length in time), there may be different tables and/or mappings of processing duration value to TA value. In some variants, the processing timing may be determined based on a terminal and/or UE capability. For example, a radio node may determine the processing timing and/or TA value based on a capability, which may be signaled to it, and/or configure the terminal or UE accordingly, e.g. with a table to be used. A terminal or UE may determine the processing timing based on its capability, e.g. choose and/or determine which table to use for mapping an processing duration value indication to a TA value.

Processing and/or receiving uplink signaling may comprise determining the processing timing, e.g. by indexing one or more tables, and/or summing processing duration value and/or TA value (which may be retrieved from the table/s), and/or calculating and/or estimating the processing timing. The terminal or radio node may comprise a determining module for such determining. Generally, a terminal and/or radio node may comprise processing circuitry, and/or radio circuitry, and/or be adapted for using such to perform the respective actions or methods described herein.

Generally, to different ranges of timing advance values different processing duration values are assigned, based on which the processing duration value is determined. TA values may be arranged in different ranges, e.g. 2, 3 or more different ranges. To each range, there may be associated or assigned a (different) processing duration value. The mapping of TA values and/or ranges may generally be based on a table. Such a table may be stored on a terminal (e.g., configured by a radio node), and/or stored on a radio node. It may be considered that a terminal stores more than one table, and/or that a radio node configures the terminal or UE with the table to use for UL signaling). A radio node may store more than one table, and/or choose a table corresponding to one used by and/or configured to the terminal or UE.

It may be generally considered that the processing duration value is determined as a function of the timing advance value.

Alternatively or additionally, there may be considered a method for operating a radio node, the method comprising configuring a terminal or user equipment. A radio node adapted for configuring a terminal or user equipment may also be considered. Configuring may comprise configuring the terminal or UE for performing a method for operating a terminal or UE as described herein. Configuring may in particular comprise configuring the terminal or UE with a relation and/or mapping between one or more timing advance values and one or more processing duration values, e.g. with a corresponding indication, which e.g. may refer to a function and/or table. Configuring a UE or terminal may comprise configuring the UE or terminal with a processing duration value indication, which may indicate which processing value to use, e.g. indexing such on a table.

Any of the radio nodes may generally be adapted for configuring, and/or configure, a terminal or UE with the timing advance value and/or with a UL grant. A UL grant may indicate resources for UL transmission for a terminal.

A radio node may generally comprise a receiving module for receiving as described herein, and/or a configuring module for configuring as described herein. A terminal or UE may comprise a processing module for processing as described herein, and/or a transmitting module for transmitting as described herein.

It may be considered that processing UL signaling comprises, and/or is based on receiving downlink, DL, signaling, pertaining to the UL signaling. DL signaling pertaining to UL signaling may indicate and/or configure and/or schedule and/or trigger the UL signaling. Such DL signaling may comprise an UL grant, and/or reference signaling for measurements and/or data, e.g. for HARQ signaling (as a form of UL signaling).

In some variants, UL signaling may represent, and/or comprise, signaling on a physical control channel, e.g. a shared (for more than one terminal/s) or dedicated (associated to the terminal specifically) control channel. A control channel may be limited to transmissions of uplink control information.

Moreover, there may be considered a program product comprising instructions, the instructions causing processing circuitry to perform and/or control any one or any combination of the methods described herein.

A carrier medium storing and/or carrying a program product as described herein is also described.

BRIEF DESCRIPTION OF THE DRAWINGS

The drawings are provided to illustrate and elucidate the approaches and concepts discussed herein, and are not intended to limit their scope.

The drawings comprise:

FIG. 13, showing optional implementations of an indicated parameter to determine processing time requirement;

FIG. 14, showing an exemplary indicated parameter depending on UE capability;

DETAILED DESCRIPTION

In the following, there reference is made to LTE as an exemplary cellular communication system. However, the approaches and concepts discussed may be applied in other systems, in particular 5G systems, e.g. NR (New Radio) or LTE Evolution. The terms "terminal" and "UE", as well as "radio node" and "base station" may be considered interchangeably used.

Figure 1:
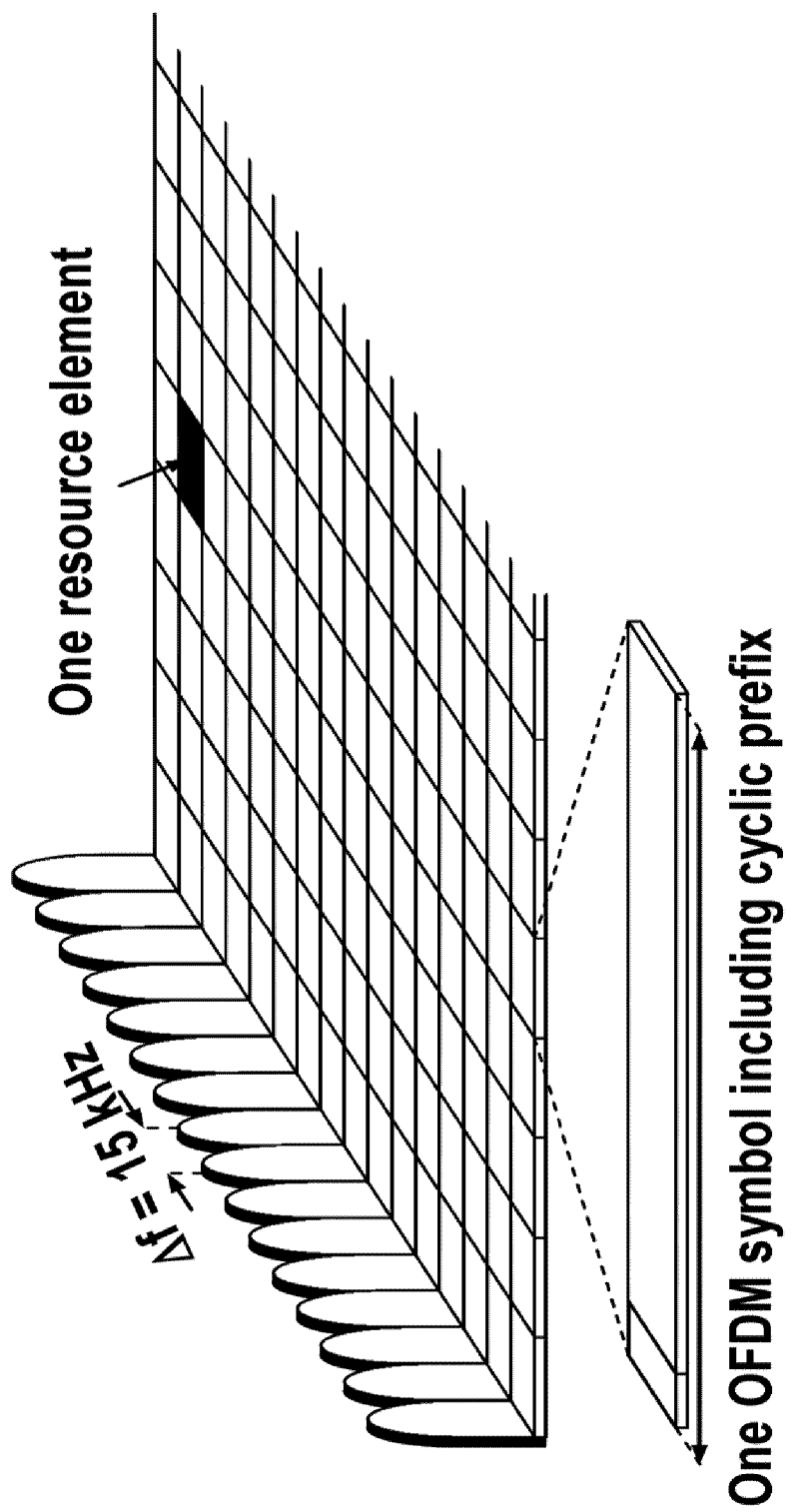
FIG. 1, showing an exemplary LTE downlink physical resource structure.
Figure 2:
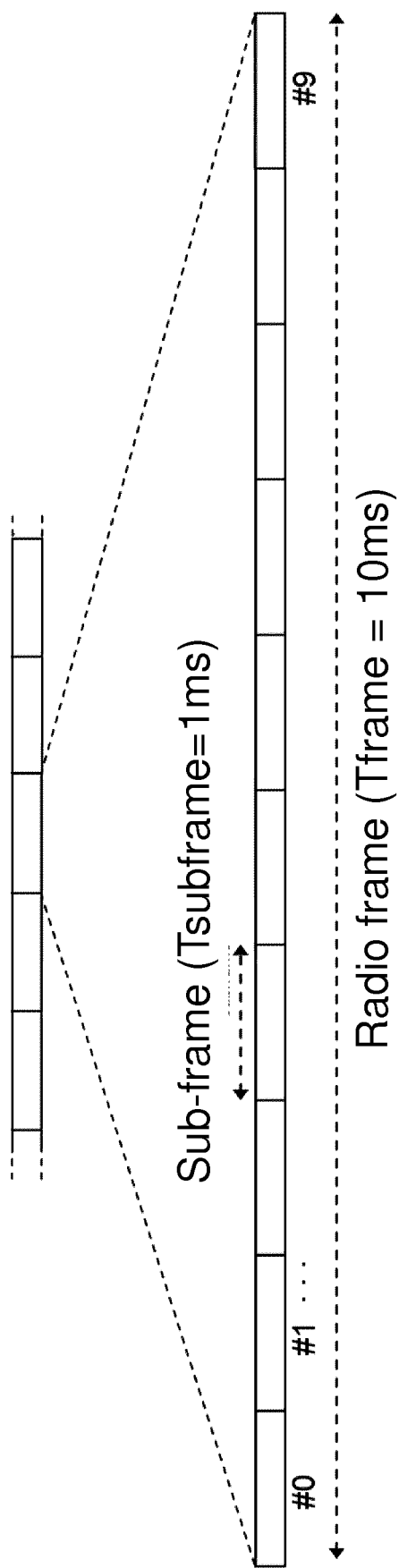
FIG. 2, showing an exemplary LTE time-domain structure.

LTE uses OFDM (orthogonal frequency domain multiplexing) in the downlink and DFT-spread OFDM in the uplink. The basic LTE downlink physical resource can thus be seen as a time-frequency grid as illustrated in FIG. 1, where each resource element corresponds to one OFDM subcarrier during one OFDM symbol interval. NR may use OFDM and DFT-spread OFDM in the uplink.

In the time domain, LTE downlink transmissions are organized into radio frames of ms, each radio frame consisting of ten equally-sized subframes of length $T_{subframe}=1$ ms.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth.

Figure 3:
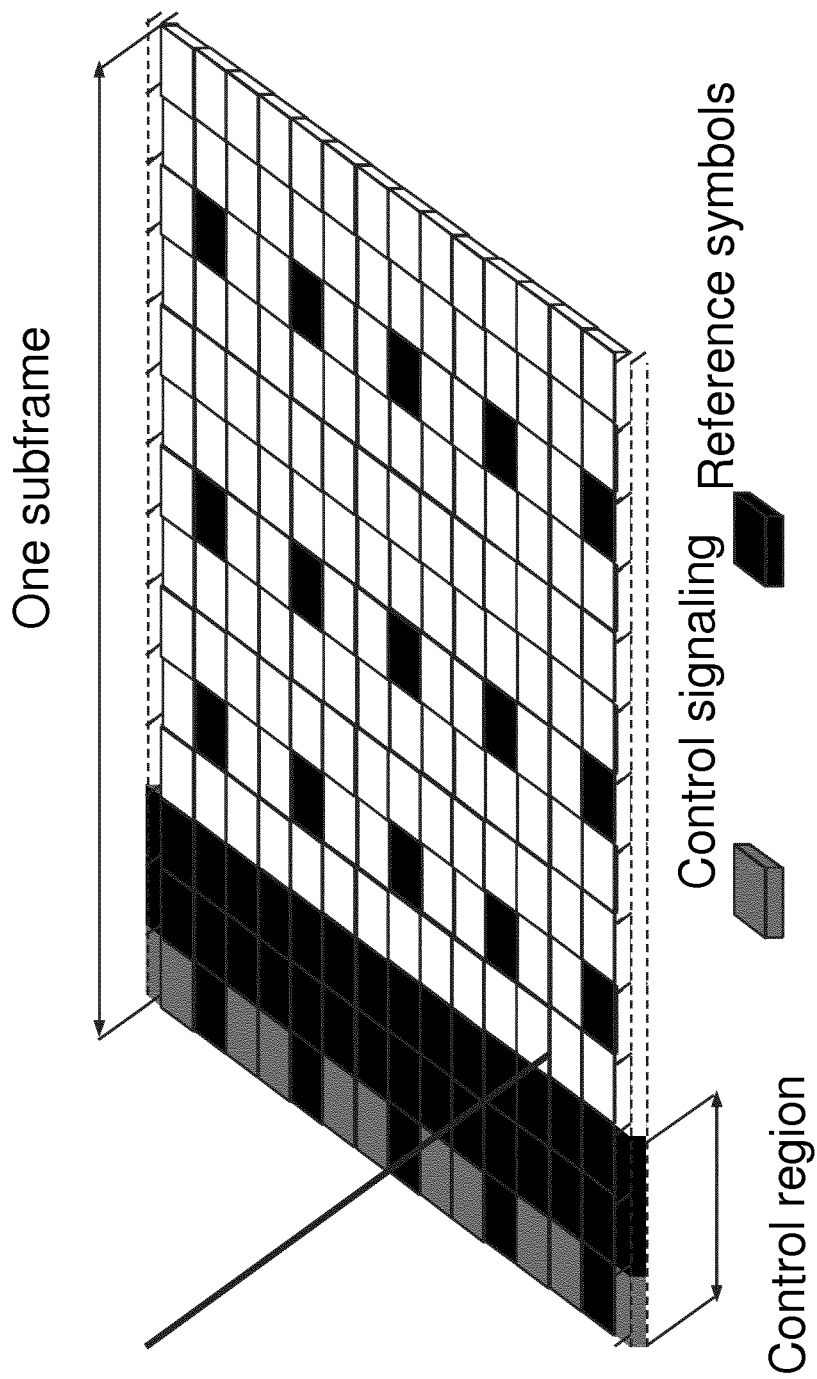
FIG. 3, showing an exemplary downlink subframe structure.

Downlink transmissions are dynamically scheduled, i.e., in each subframe the base station (eNodeB) configures with and/or transmits control information about to which terminals data is transmitted and upon which resource blocks the data is transmitted, in the current downlink subframe. This control signaling is typically transmitted in the first 1, 2, 3 or 4 OFDM symbols in each subframe. A downlink system with 3 OFDM symbols as control is illustrated in FIG. 3.

LTE uses hybrid-ARQ, where, after receiving downlink data in a subframe, the terminal attempts to decode it and reports to the base station whether the decoding was successful (ACK) or not (NAK or NACK). In case of an unsuccessful decoding attempt, the base station can retransmit the erroneous data.

Uplink control signaling (uplink control information) from the terminal to the base station may generally comprise
Hybrid-ARQ acknowledgements for received downlink data and/or;
Terminal reports (e.g., measurement reports) related to the downlink channel conditions, used as assistance for the downlink scheduling and/or;
Scheduling requests, indicating that a mobile terminal needs uplink resources for uplink data transmissions.

The terminal reports related to the downlink channel conditions, e.g. for LTE, include channel quality indicator (CQI), precoding matrix indicator (PMI) and rank indicator (RI).

Figure 4:
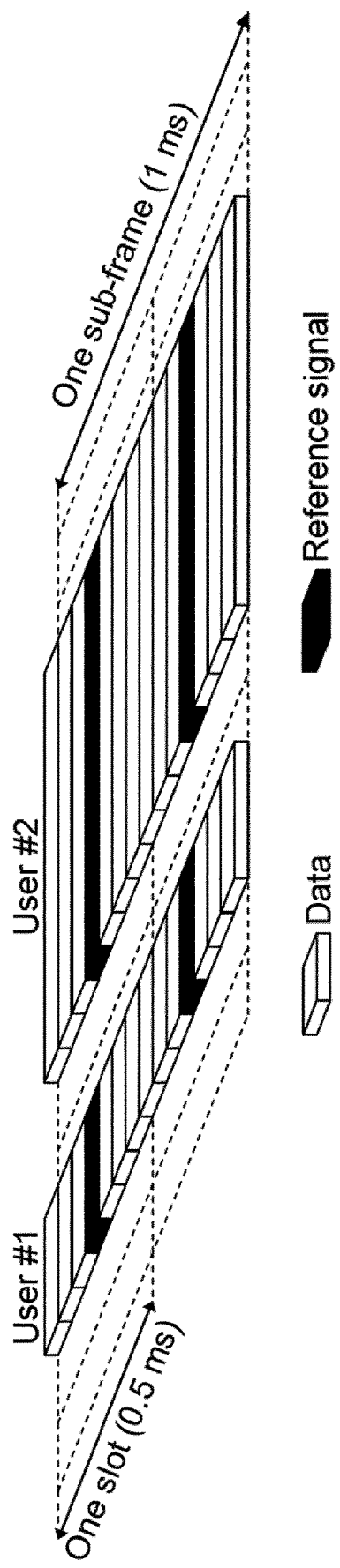
FIG. 4, showing an exemplary PUSCH resource assignment.

To transmit data in the uplink, the terminal has to be assigned (allocated and/or configured and/or scheduled) an uplink resource for data transmission, e.g., on the Physical Uplink Shared Channel (PUSCH). In contrast to a data assignment in downlink, in uplink the assignment is consecutive in frequency, to retain the single carrier property of the uplink as illustrated in FIG. 4 (this holds for DFT-OFDM in the uplink).

The middle SC-FDMA (DFT-OFDM symbols are also referred to as Single Carrier FDM symbols) symbol in each slot is used to transmit a reference signal. If the terminal has been assigned an uplink resource for data transmission, and at the same time instance has (uplink) control information to transmit, it may transmit the control information together with the data on PUSCH (this may be implemented generally, e.g. for LTE or NR).

Several UEs may be transmitting in the same subframe, and received simultaneously by the base station or eNB. It is desirable to keep the UEs time aligned at the receiver, the base station or eNB. This preserves orthogonality between users, so that an FFT (Fast Fourier Transformation) can be performed over the entire bandwidth in the base station, which will separate the users in frequency domain. It will also reduce complexity in the eNB to use a single FFT for all users.

Figure 5:
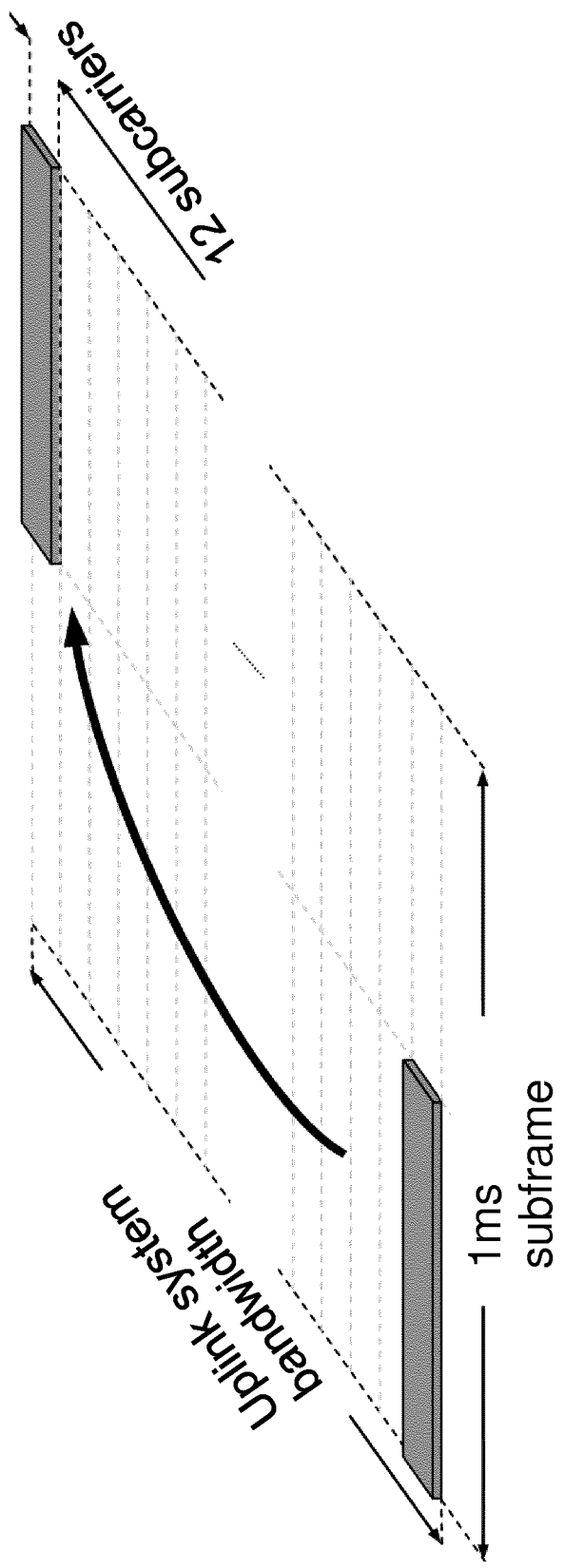
FIG. 5, showing an exemplary PUCCH structure.

A Physical Uplink Control Channel (PUCCH) may be used for transmitting control information in uplink. A structure of a PUCCH is illustrated in FIG. 5. The transmission from each terminal occupies one physical resource block in each of the two slots in a subframe. Frequency hopping is used between the slots to provide diversity.

In each physical resource block used for PUCCH, several users may transmit simultaneously. Code multiplexing is used to keep the signals orthogonal within the same cell.

If a terminal needs to transmit both data and control information, generally, it may be considered that a PUCCH is not used, and the control information may instead be multiplexed into the data transmission on PUSCH, e.g. to maintain the single carrier property of the uplink signaling.

One area to address when it comes to packet latency reductions is the reduction of transport time of data and control signaling, by addressing the length of a transmission time interval (TTI). In LTE release 8, a TTI corresponds to one subframe (SF) of length 1 millisecond. One such 1 ms TTI is constructed by using OFDM or SC-FDMA symbols in the case of normal cyclic prefix and 12 OFDM or SC-FDMA symbols in the case of extended cyclic prefix. Currently, for LTE transmissions with shorter TTIs that are much shorter than the LTE release 8 TTI are being defined.

It should be noted that the reference to TTI herein pertains to the Transmission Time Interval over the physical layer, i.e. when transmitting over the air interface. This is not fully aligned with the definition in the specifications of TTI for higher layer/s in LTE. Furthermore, it can be noted that the terminology to use for a shorter transmission time over the air interface is being discussed in 3GPP, and the use of the terminology "shortened TTI" is likely to be changed. An example terminology that is being discussed is partial subframe (PSF).

The shorter TTIs can be decided to have any duration in time and comprise resources on a number of OFDM or SC-FDMA symbols within a 1 ms SF. As one example, the duration of the short TTI (sTTI) may be 0.5 ms, i.e. seven OFDM or SC-FDMA symbols for the case with normal cyclic prefix. As another example, the duration of the short TTI may be 2 symbols. In another example, the duration of the short TTI may be 4 symbols. The TTI can be same in the UL and DL of the same cell. The TTI can also be different in UL and DL in the same cell e.g. 0.5 ms in DL and 1 ms in UL. The TTI can also be different in different serving cells of the UE e.g. TTI of 2 symbols in PCell and TTI of 1 ms in an Scell.

The shortened TTI can be used in different values in different direction, such as DL and UL. For example: a DL can use 2-OS sTTI, while UL can use 4-OS sTTI in the same cell.

For different frame structures, such as FS1, FS2 and FS3, the sTTI that is used could be different too. The time domain structure shown relates to FS1. 2-OS, 4OS and 7 OS TTI are usable for FS1. For FS2 which is used for TDD, 7-OS sTTI is one of the shortened TTI mode.

Figure 6:
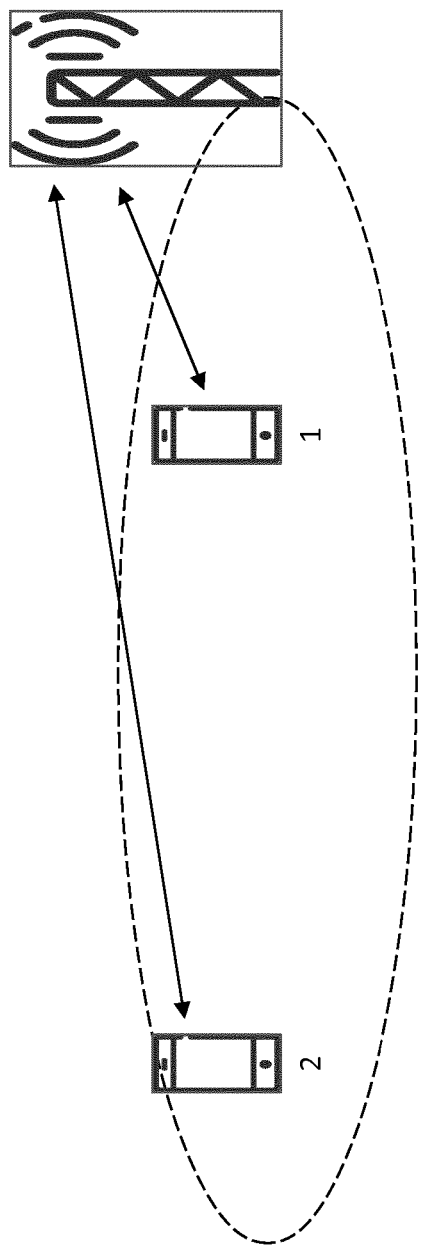
FIG. 6, showing an illustration of cell with two UEs at different distance from an eNodeB.
Figure 7:
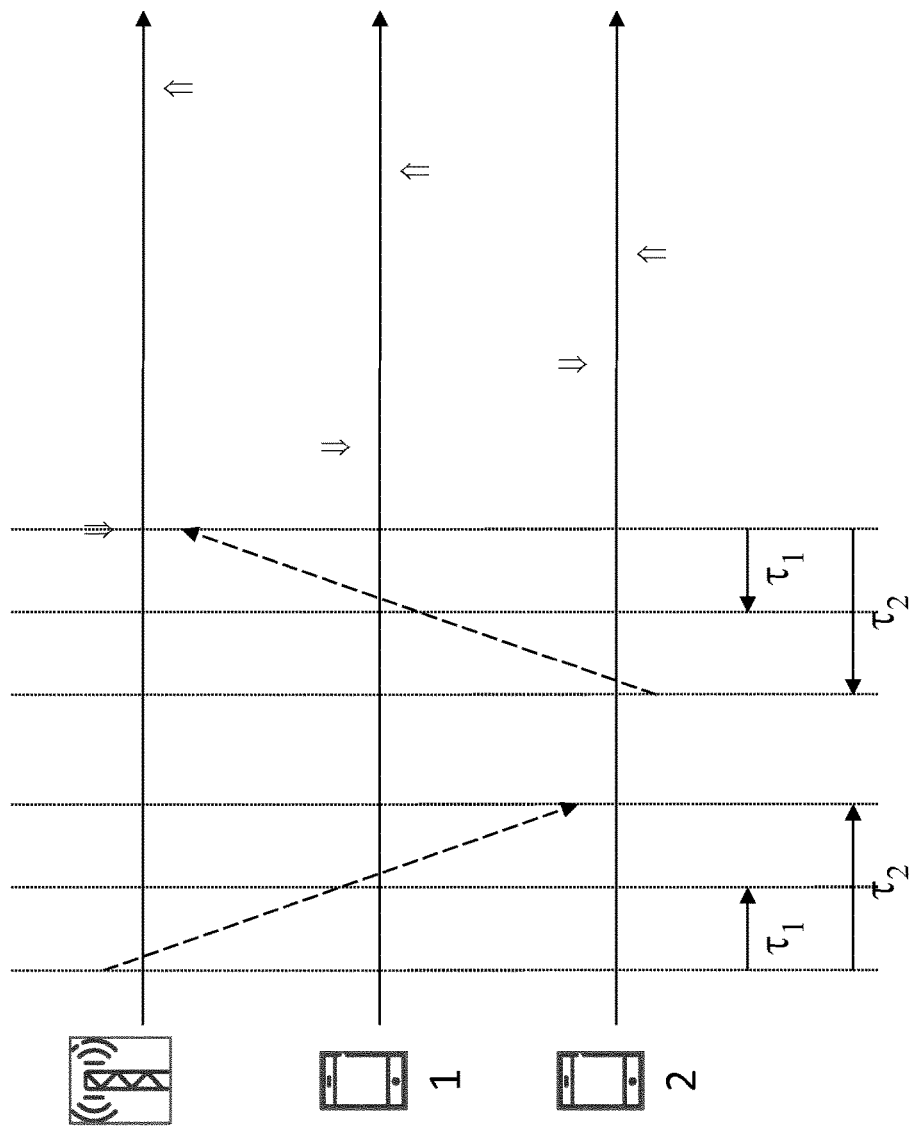
FIG. 7, showing an example of timing advance of UL transmissions depending on distance to eNodeB.
Figure 8:
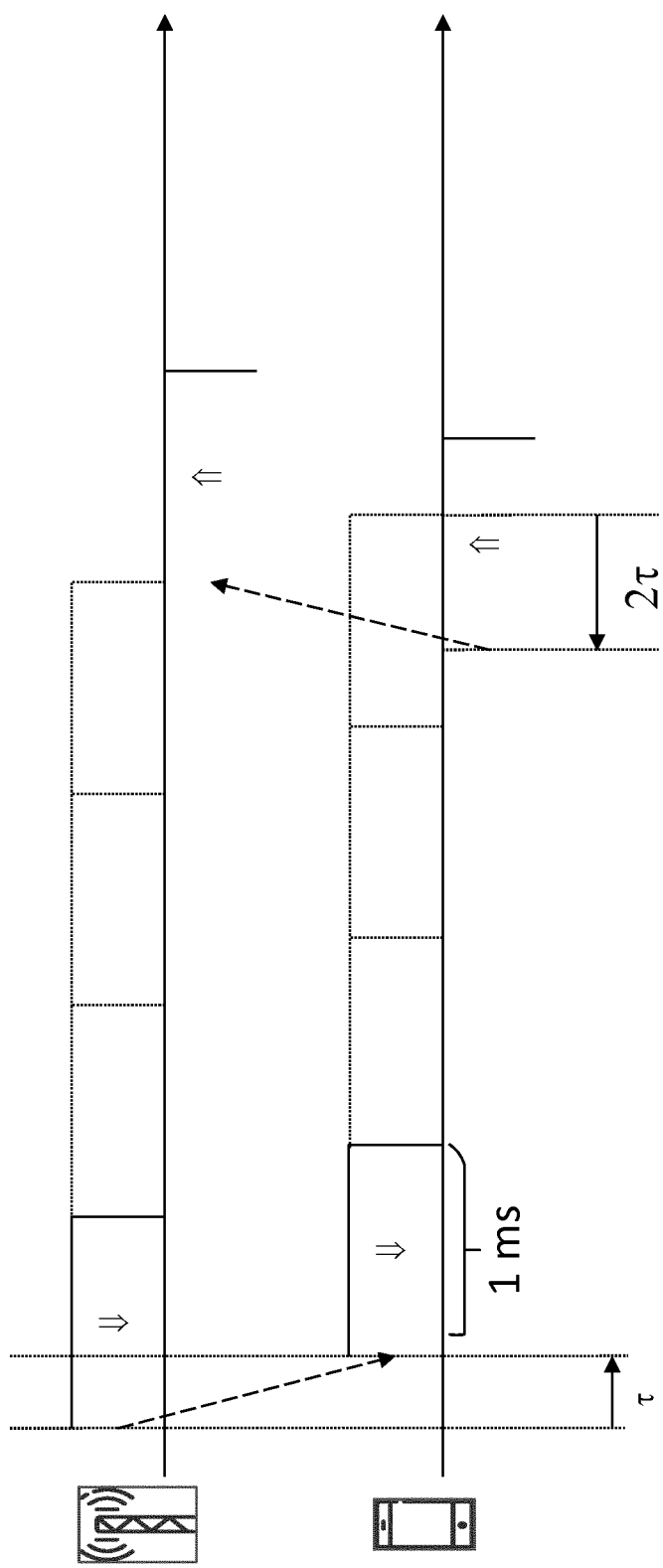
FIG. 8, showing an example scenario illustrating the impact of TA on processing time.

To preserve the orthogonality in UL (as mentioned above), the UL transmissions from multiple terminals or UEs need to be time aligned at the base station or eNodeB. Since terminals or UEs may be located at different distances from the eNodeB (see FIG. 6, with terminal 1 and 2 having different distances), the terminals or UEs will need to initiate their UL transmissions at different times. A UE far from the eNodeB (UE2, see FIG. 6) needs to start transmission earlier than a UE close to the eNodeB (UE1, see FIG. 1). This can for example be handled by time advance (or timing advance) of the UL transmissions, according to which a UE starts its UL transmission before a nominal time given by the timing of the DL signal received by the UE. This concept is illustrated in FIG. 7.

The UL timing alignment is maintained by the eNodeB through timing alignment commands (configuring the terminals/Ues) to the UE based on measurements on UL transmissions from that UE. As shown in FIG. 7 the propagation delay t1 and t2 for UE1 and UE2 respectively, is the same in UL and DL.

Through timing alignment commands (e.g., configuring a timing advance), the UE is ordered to start its UL transmissions earlier. This typically applies to all UL transmissions except for initial access, e.g., the random access preamble transmissions on PRACH (Physical Random Access Channel) for LTE (including transmissions on both PUSCH and PUCCH).

The processing time is illustrated in the following.

There is typically a strict relation between DL transmissions and the corresponding UL transmission.

Examples of this in LTE are

The timing between a DL-SCH transmission on PDSCH to the HARQ ACK/NACK feedback transmitted in UL (either on PUCCH or PUSCH);

The timing between an UL grant transmission on PDCCH to the UL-SCH transmission on PUSCH.

By increasing the timing advance value for a UE, the UE processing time between the DL transmission and the corresponding UL transmission decreases, as the UL signaling has to be transmitted earlier. For this reason, an upper limit on the maximum timing advance has been defined by 3GPP in order to set a lower limit on the processing time available for a UE. For LTE, this value has been set to roughly 667 us which corresponds to a cell range of 100 km (note that the TA value may generally compensate for the round trip delay).

In terms of the shortened TTI feature, the maximum allowed TA is currently under discussion. But, it can be noted that the shorter the TTI is, and the more reduced the processing time is, the larger portion of the overall processing time will the timing advance consume.

In current LTE, the processing time is based on a processing duration value of N+4, meaning that if a UE receives for example PDSCH signaling in subframe 3, it is expected to respond with HARQ information (e.g., on PUCCH) in subframe 7 (3+4). Hence, the nominal processing time allowed is 3 ms, but considering propagation delay, and the maximum allowed TA, the processing time becomes 3−0.667=2.333 ms. Hence, 0.33 ms is the maximum allowed propagation delay, which, over the air corresponds to a cell size of roughly 100 km (3e8*0.33e−3).

Deployment options are discussed in the following.

Timing Advance is traditionally considered strongly related to the cell size supported. For example, it may be based on assuming that the baseband unit of the base station is allocated at a distance from the antenna connector that is ignorable from a propagation delay point of view.

Figure 9:
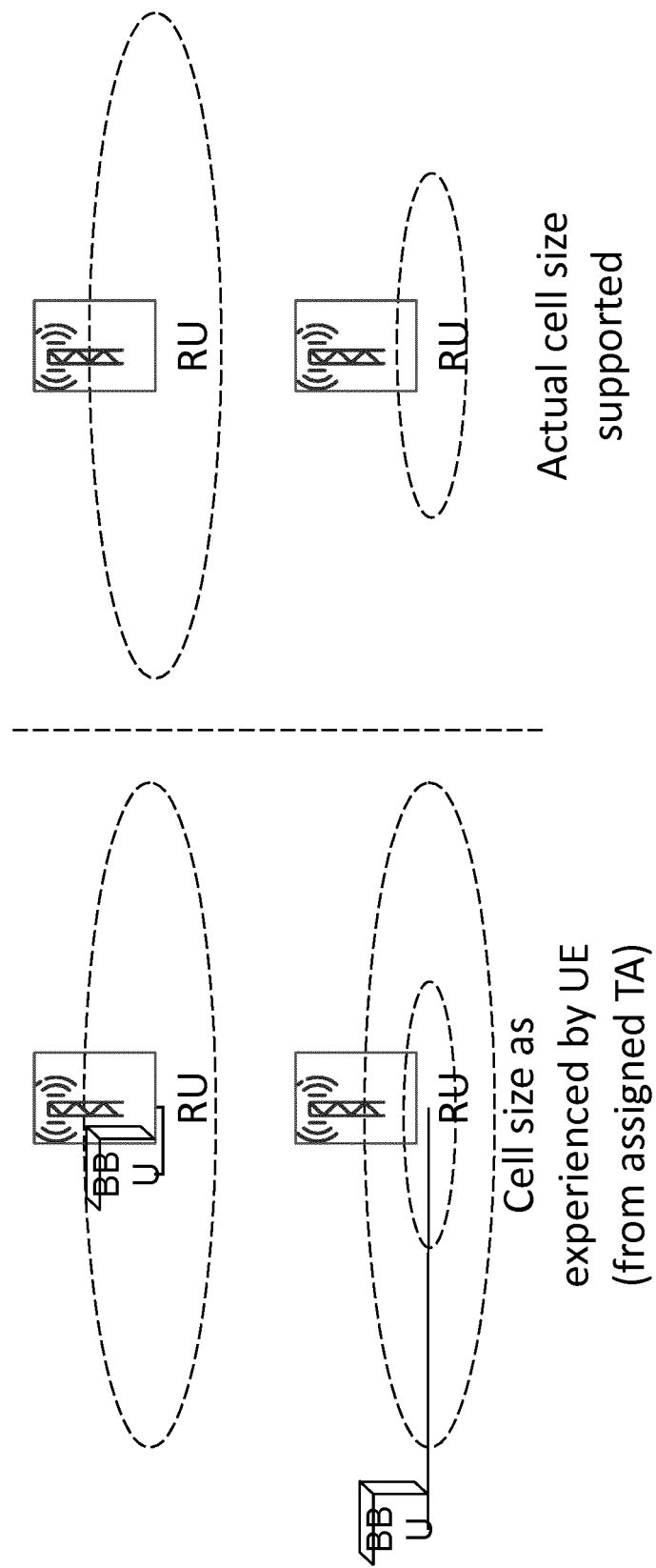
FIG. 9, showing different cell sizes supported with a certain TA in different deployments FIG. 10, showing examples of TA dependent processing time.

However, with centralized-RAN (C-RAN) type deployments, the baseband unit can be allocated several km from a remote radio head (RRH)/remote radio unit (RRU)/radio unit (RU), in which case the propagation delay over the fiber also needs to be considered. In case of RRU deployments, the timing advance is typically set so as to compensate the two-way propagation delay between the UE and central unit which thus includes the two-way propagation delay between RRU and central unit. From a UE PoV, this type of deployment will result in timing advance values always larger than zero, and the maximum cell size that can be supported will decrease with the increased distance between the BBU and the RRU, see FIG. 9.

As can be seen, if the maximum TA is too small, the actual cell size supported might be too small for practical deployments, or even not feasible (if already the fiber delay between BBU and RU is larger than the maximum TA supported). Since the signal propagation speed is smaller in fiber than over the air, the propagation delay due to the communication/distance between RRU and the central unit can be the predominant component of the TA value.

Such aspects of reduced processing time and deployment options, lead to effects that when reducing the processing time at the UE, the portion of the TA due to the propagation delay, becomes a larger and larger part of the overall time allowed for processing. To alleviate the processing requirements, one solution would be to reduce the maximum timing advance allowed, but this will instead provide limitations in the deployments that can be supported (with or without RRH deployments).

The approaches discussed herein facilitate minimizing such issues. In particular, it is proposed a TA dependent processing time/processing duration value for or at the UE.

In one variant, the HARQ feedback timing and the UL grant timing are defined in a look-up table, or similar, depending on the TA assigned to the UE. If a small TA is assigned to the UE, a shorter HARQ feedback/UL grant timing applies. If the TA assigned to a UE is larger, the HARQ feedback timing and UL grant timing are increased to give UE similar amount of time for the actual processing. An example is provided in FIG. 10, e.g. for a case in which a shortened TTI is 2 OFDM symbols (instead of 14 ODFM symbols, or 1 ms, as in current LTE), e.g. around 0.14 ms, with a nominal processing time of either 3, 4 or 5 TTI (following the way the processing time is specified today, it would correspond to a N+4, N+5 and N+6 HARQ feedback/UL grant timing).

Figure 11:
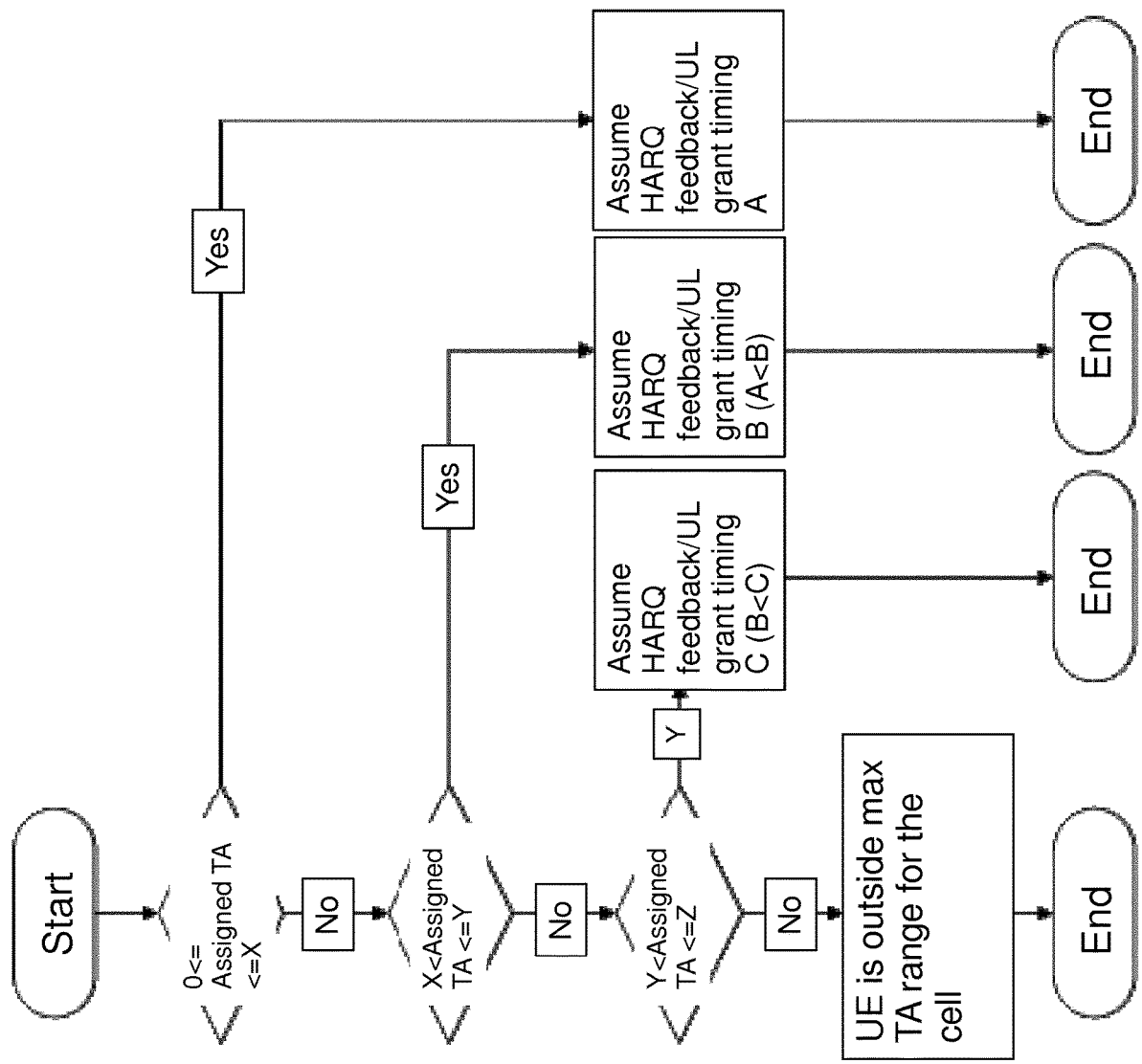
FIG. 11, showing a flow diagram of an exemplary method for operating with TA dependent processing time.

According to this variant, the processing time at the UE is only slightly impacted by the TA assigned (ideally the same processing time could be targeted for the assigned TAs before switching to a longer HARQ feedback/UL grant timing). Hence, the processing time in all three cases at the UE side is roughly the same (0.32, 0.28 and 0.30 ms respectively), while the actual delay until the response from the UE is delivered at the eNB is significantly different (N+6 at most, and N+4 at least). Alternatively, the TA thresholds could be determined based on a minimum processing time budget for the UE. For instance, consider that a UE requires at least 0.28 ms for processing, the TA threshold to use the timing N+4 would then 0.14 ms (determined by the nominal processing time−max TA, i.e. 3*0.14−0.28). The TA threshold to use the timing N+5 would be 0.28 ms (4*0.14−0.28) and the TA threshold to use the timing N+6 would be 0.42 ms (5*0.14−0.28). The principle of this approach is also illustrated in FIG. 11.

As can be seen, a UE with an assigned TA falling between two TA thresholds follows the HARQ feedback/UL grant timing having a TA threshold larger than the assigned TA. For instance, a UE with an assigned TA of 0.2 ms follows the N+5 timing.

Note that a UE with an assigned TA superior to (larger than) the largest maximum TA threshold considered for the HARQ feedback/UL grant timing is not expected to be scheduled with sTTI by the eNB. It would be served using 1 ms TTI.

In another variant, the HARQ timing is determined based on a combination of UE capability and assigned TA. In the example given above, a 0.28 ms minimum processing time budget is assumed for a UE. It can be considered that some more advanced UEs would require less processing time while some less advanced UEs would require more processing time. A more advanced UE implementation could for instance require only 0.20 ms minimum processing time, leading to a TA threshold of 0.22 ms, 0.36 ms, 0.50 ms for a HARQ feedback timing/UL grant timing of N+4, N+5 and N+6 respectively. A less advanced UE implementation could for instance require 0.35 ms minimum processing time, leading to a TA threshold of 0.07 ms, 0.21 ms, 0.35 ms for a HARQ feedback timing/UL grant timing of N+4, N+5 and N+6 respectively. If different UE capabilities related to processing time exist, the UE has to indicate a processing time related UE capability to the eNB, the eNB may confirm the usage of the set of applicable TA thresholds and the same procedure as explained earlier can take place. Alternatively, the eNB can consider all possible UE capabilities present in the cell and broadcast to all UEs to use the HARQ feedback/UL grant limited by the least capable UE to simplify network implementation (all UEs would apply the same HARQ feedback/UL grant timing).

In another variant, the UE is configured with a specific HARQ timing. The HARQ timing is further associated with a maximum TA that is supported for that specific HARQ timing. So that if the UE exceeds that the accumulated TA value the UE may not be able to operate with that HARQ timing. Consequently, the eNB would need to reconfigure the UE to a more relaxed HARQ timing for sTTI operation or shortened processing time. Alternatively, the eNB could under such occasions schedule the UE with the n+4 subframe a subframe long transmission duration, wherein the maximum supported TA is longer and what it is for the shortened processing time (with or without shortened transmission durations). To exemplify the eNB would configure the UE with N+4 timing for shortened transmission duration if it maximum TA is lower than the smallest limit that could for example be 0.14 ms. Above that the eNB would operate either with 1 ms operation or/and reconfigure the UE to n+6 timing. The reconfiguration of the HARQ timing at the UE side can be done by the eNB by a DCI message, MAC CE or RRC message. Further the HARQ timing would also apply UL grant timing. The timing of these may further also be different and not the same.

In the above variants, it is assumed that the UE continuous to accumulate the TA even if it has reach above the maximum TA value. It could further be so that the UE does not accumulate the TA command if it goes beyond the maximum TA value and instead the transmission timing at the UE would not be suitable for the eNB. By that the eNB could detect that the TA value is exceeded.

Computation of TA based on signaled adjustments is discussed in the following.

In the first variant, the assigned TA could either be a value calculated based on an initially assigned value followed by subsequent relative updates to the initially assigned TA value. This is similar to how LTE works today where an absolute TA is first assigned during random access procedure (in the random access response, RAR), while, after the initial TA has been assigned, the network updates the TA in MAC Control Element (CE) after continuous measurement at the eNB receiver.

Direct signaling of applicable TA or applicable HARQ feedback/UL grant timing is discussed in the following.

The network node (base station) and UE node should be aligned in the assigned TA, since otherwise the UE could assume a different processing time than assumed by the network. To make the system more robust, the eNB can, as an alternative embodiment, assign an absolute TA not only during random access, but also when continuously updating the TA of the UE. The assignment can happen at specific intervals, or during specific events, where an absolute TA is assigned instead of a relative TA (to the previous TA). As an alternative, absolute TA is always assigned. An alternative is to signal directly the applicable HARQ feedback/UL grant timing to the UE instead of the TA. To indicate TA or the applicable HARQ feedback/UL grant timing several options can be considered: higher layer signaling e.g. RRC, MAC signaling as part of a MAC control element or Li signaling as part of a sTTI-related downlink control information (DCI) sent on a downlink physical control channel (e.g. PDCCH or sPDCCH).

In a further variant, to improve the robustness of the assigned TA at the UE and eNB, an acknowledgement (as small as a single bit) can be required to be sent by the UE pertaining to the assigned TA. As an alternative embodiment, the UE can be required to report the assigned absolute TA to the network, or as a further alternative the assumed processing time could be reported. This response can be specified to always occur with a fixed processing time in which case it would not be depending on the assigned TA.

To avoid the possible impact of a UE not being in synch with the network regarding the assigned TA, an alternative embodiment provides the maximum TA in the cell, as a broadcasted parameter. It could for example be provided as part of the system information, e.g. the MIB or SIB in LTE. A benefit with this approach is that all UEs in the cell would apply the same reaction time, which simplifies the eNB implementation. The broadcast based approach for signaling TA is particularly attractive in case of RRU deployment. In those deployments, the RRU-BBU distance is likely to be the predominant component of the TA. The UE-RRU distance is likely to have small to negligible impact on the TA. Setting a common TA for sTTI operation to all UEs in a cell is thus appropriate. However, this approach can also be seen as a drawback since the reaction time will not be shorter for a UE which is assigned a small TA value. Instead all UEs will follow the HARQ feedback/UL grant timing based on the maximum TA assigned in the cell. However, there will never be any mismatch between the HARQ feedback/UL grant timing assumed at the UE side and the one assumed at the eNB.

Figure 12:
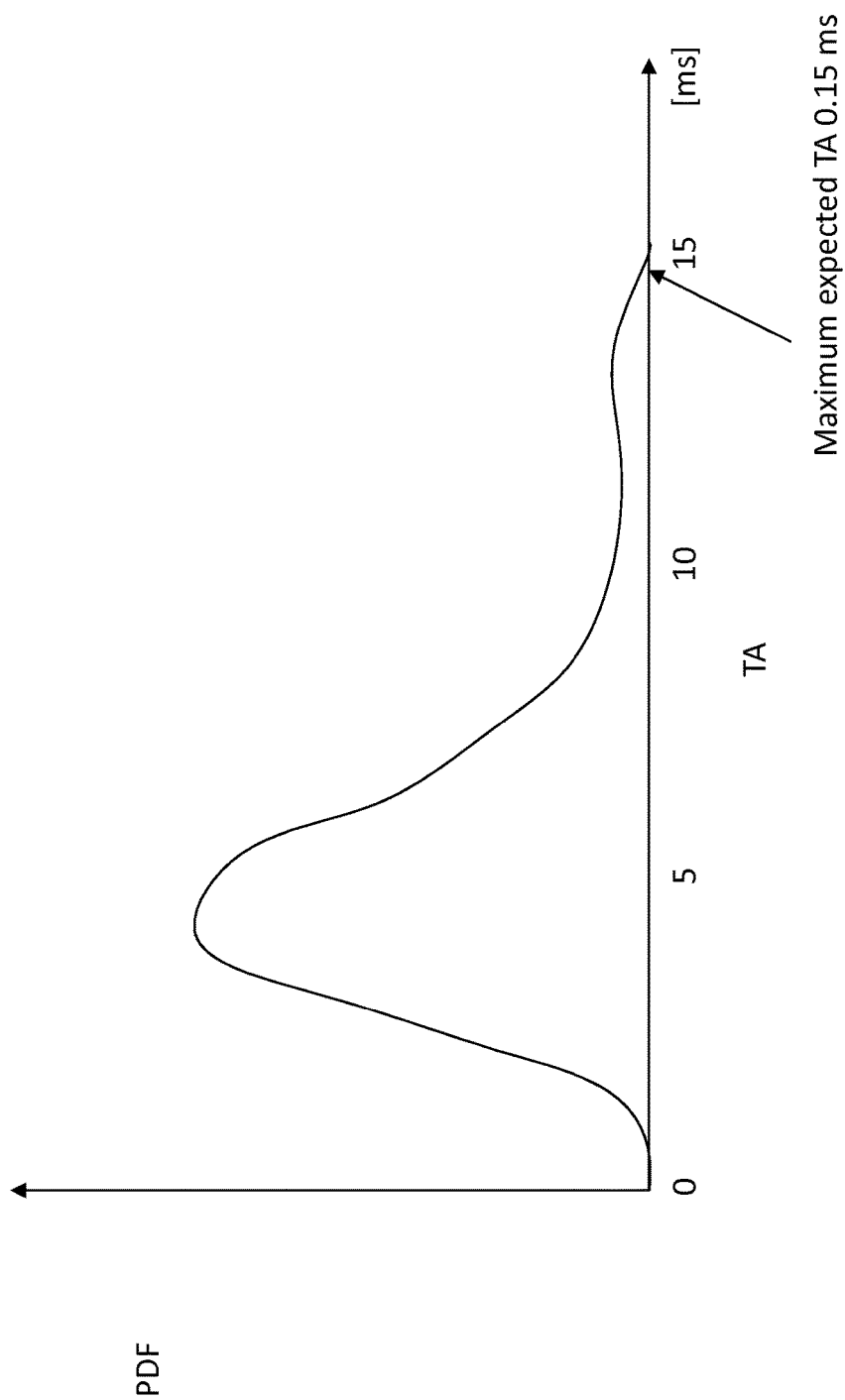
FIG. 12, showing exemplary PDF of TA in a cell.

In one embodiment related to implementation, the eNB can determine the maximum TA to broadcast in the cell by analyzing accesses made by UEs that always apply the same reaction time (i.e. they are not dependent on the broadcasted value mentioned above). An example of collected TA values in a cell is provided in FIG. 12, from which a maximum TA expected in the cell is determined, and broadcasted. It should be noted that what is referred to above as a broadcasted maximum TA, 55o could be any information that would allow the UE to determine the allowed HARQ feedback/UL grant timing. For example, the HARQ feedback/UL grant timing itself could instead be broadcasted (with the assumption that the UE would know that this implies a certain maximum limitation of the TA that would be assigned).

Figure 10:
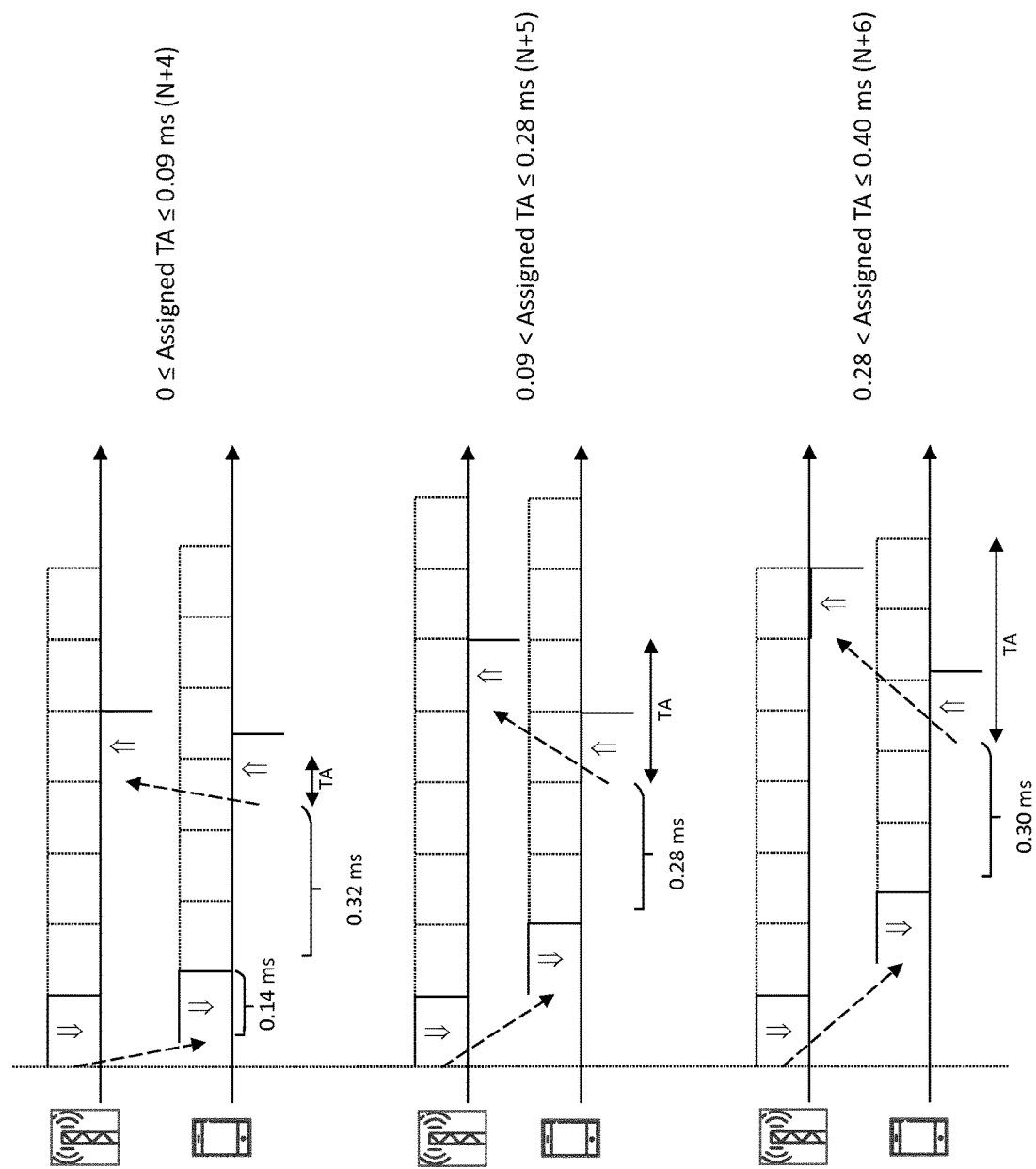

In case of a direct indication of the applicable TA or HARQ feedback/UL grant timing by the eNB to the UE (either in a UE-specific message or a broadcasted message), two possible implementations of an indicated 2 bit field is shown in FIG. 13, based on the example of FIG. 10.

In one variant, different UE capabilities are supported in the network to allow for UEs capable of different processing requirements. For a certain capability the defined switching times and/or processing times could be partly in common with another capability or defined separately. An example is provided below in FIG. 15 where the same two bits are used broadcasted in the network but being interpreted in different ways by two different UE capabilities.

In this disclosure, sometimes a first node and a second node as two nodes which are either transmitting or receiving in unlicensed spectrum (or a shared spectrum where more than one system operates based on some kind of sharing regulations) may be considered.

An example of a first node could be a radio node or network node, which could be a more general term and can correspond to any type of radio network node or any network node, which communicates with a UE and/or with another network node. Examples of network nodes are NodeB, base station (BS), multi-standard radio (MSR) radio node such as MSR BS, eNodeB, gNodeB. MeNB, SeNB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc.

Another example of a node could be terminal or user equipment, referring e.g. to any type of wireless device communicating with a network node and/or with another UE in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. In some embodiments generic terminology, "radio network node" or simply "network node (NW node)", is used. It can be any kind of network node which may comprise of base station, radio base station, base transceiver station, base station controller, network controller, evolved Node B (eNB), Node B, relay node, access point, radio access point, Remote Radio Unit (RRU) Remote Radio Head (RRH) etc.

The term signal or signaling used herein may pertain to any physical signal or signaling, or physical channel, respectively any signal or message carried on a physical channel. Examples of physical signals are reference signal such as PSS, SSS, CRS, SRS, DMRS, PRS etc. The term physical channel (e.g., in the context of channel reception) used herein is also called as channel, data channel, control channel. Examples of physical channels are MIB, NR-MIB, NR-PBCH, PBCH, NPBCH, PDCCH, PDSCH, NR-PDSCH, sPUCCH, sPDSCH. sPUCCH. sPUSCH, MPDCCH, NPDCCH, NPDSCH, E-PDCCH, PUSCH, PUCCH, NPUSCH etc.

The term TTI used herein may correspond to any time period (TO) over which a physical channel can be encoded and optionally interleaved for transmission. The physical channel is decoded by the receiver over the same time period (TO) over which it was encoded. The TTI may also interchangeably called as short TTI (sTTI), transmission time, slot, sub-slot, mini-slot, mini-subframe etc.

The approaches described herein allow minimizing network delay by tailoring UE processing time/HARQ feedback/UL grant timing based on assigned Timing Advance.

There is generally considered a program product comprising instructions adapted for causing processing and/or control circuitry to carry out and/or control any method described herein, in particular when executed on the processing and/or control circuitry.

A carrier or storage medium is also described, the storage medium storing a program product as described herein, and/or instructions adapted for causing processing and/or control circuitry to carry out and/or control any method described, in particular when executed on the processing and/or control circuitry.

Figure 15:
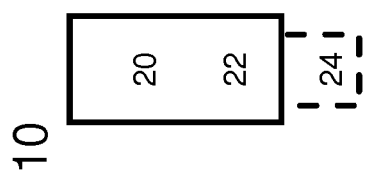
FIG. 15, showing an exemplary terminal.

FIG. 15 schematically shows a terminal 10, which may be implemented as a UE (User Equipment). Terminal 10 comprises processing circuitry (which may also be referred to as control circuitry) 20, which may comprise a controller connected to a memory. Any module of the terminal, e.g. receiving module and/or transmitting module may be implemented in and/or executable by, the control circuitry 20, in particular as module in the controller. Terminal 10 also comprises radio circuitry 22 providing receiving and transmitting or transceiving functionality (e.g., one or more transmitter and/or receiver and/or transceiver), the radio circuitry 22 connected or connectable to the control circuitry. An antenna circuitry 24 of the terminal 10 is connected or connectable to the radio circuitry 22 to collect or send and/or amplify signals. Radio circuitry 22 and the processing circuitry 20 controlling it are configured for cellular communication with a network. Terminal 10 may be adapted to carry out any of the methods for operating a terminal or UE disclosed herein; in particular, it may comprise corresponding circuitry, e.g. processing circuitry.

Figure 16:
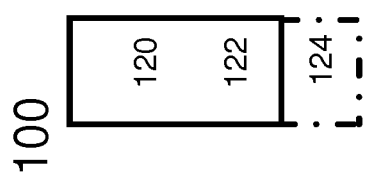
FIG. 16, showing an exemplary radio node.

FIG. 16 schematically show a radio node 100, like a network node or base station, which in particular may be an eNB, or gNB or similar for NR. Radio node 100 comprises processing circuitry (which may also be referred to as control circuitry) 120, which may comprise a controller connected to a memory. Any module, e.g. receiving module and/or transmitting module and/or configuring module of the radio node may be implemented in and/or executable by the processing circuitry 120. The processing circuitry is connected to control radio circuitry 122 of the radio node 100, which provides receiver and transmitter and/or transceiver functionality (e.g., comprising one or more transmitter and/or receiver and/or transceiver). An antenna circuitry 124 may be connected or connectable to radio circuitry 122 for signal reception or transmittance and/or amplification. The radio node 100 may be adapted to carry out any of the methods for operating a radio node disclosed herein; in particular, it may comprise corresponding circuitry, e.g. processing circuitry. The antenna circuitry may be connected to and/or comprise an antenna array. The radio node 100, respectively its circuitry, may be adapted to transmit configuration data and/or to configure a terminal as described herein.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. advance LTE and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. Transmitting in downlink may pertain to transmission from the network or network node to the terminal. Transmitting in uplink may pertain to transmission from the terminal to the network or network node.

Signaling may generally comprise one or more signals and/or one or more symbols. Reference signaling may comprise one or more reference signals or symbols. Reference signaling may be cell-specific or user-specific. A terminal or network node may be adapted to measure reference signaling, e.g. for demodulation and/or power control and/or to determine channel state information representing the transmission quality of a measured channel (representing the propagation of signaling using specific transmission parameters and/or the transmission path). Reference signaling may in particular be CSI-RS (Channel State Information Reference Signaling). It may be considered that reference signaling is received by the terminal.

HARQ (Hybrid Automatic Repeat reQuest) may be considered an approach in which a receiver (e.g., a terminal or UE) indicates whether a received data package (e.g., transport block) has been received (e.g., demodulated and/or decoded) correctly (acknowledgement, ACK) or not (nonacknowledgment, NACK) and has to be retransmitted. A transmitter (e.g., radio node) may retransmit and/or schedule for retransmission the data package accordingly. HARQ may comprise (in particular, for the receiver) forward error correction and/or error detection techniques, and/or accumulating data packages (of the same HARQ process).

Uplink signaling may generally comprise UL data transmission (e.g., user and/or payload data), and/or transmission of uplink control information. Uplink control information may comprise information regarding HARQ (e.g., ACK/NACK or a HARQ indication), and/or transmission power information (e.g., Transmission Power Command, TPC, and/or other absolute power value information), and/or measurement reporting (e.g., Channel State Information and/or cell-specific measurement information and/or terminal-specific measurement information) and/or resource request information (e.g., request of an uplink grant and/or transmission queue information). Uplink control information may be transmitted on one or more physical control channels, e.g. a PUCC or a HARQ control channel (for HARQ transmission).

A measurement report (representing measurement reporting) may generally represent information based on, and/or pertaining to, measurement/s that have been performed on reference signaling. The report type may pertain to the measurement report. A measurement report may comprise and/or indicate measurement samples and/or information pertaining thereto and/or parameters determined based on measurements performed, and/or information related to channel state or quality, e.g. CSI information, e.g. CQI and/or PMI and/or RI. The report may contain values computed and/or estimated and/or calculated based on measurement results, as examples of a report being based on and/or determined based on measurements. A measurement report may indicate a motion status, and/or be considered a motion status indication. In particular, a network node/radio node may be adapted to determine, and/or may comprise a determining module, and/or perform determining, a motion status based on a (received) measurement report. Such determining may be based on, and/or comprise, processing and/or evaluating the measurement report.

There is disclosed a carrier (or storage) medium arrangement carrying and/or storing at least any one of the program products described herein and/or code executable by processing and/or control circuitry, the code causing the processing and/or control circuitry to perform and/or control at least any one of the methods described herein. A carrier medium arrangement may comprise one or more carrier media. Generally, a carrier medium may be accessible and/or readable and/or receivable by processing circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A terminal may be implemented as and/or represent a user equipment. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or a user equipment is adapted for one or more RATs, in particular LTE/E-UTRA. A terminal or user equipment may generally be proximity services (ProSe) enabled, which may mean it is D2D (device-to-device) capable or enabled. It may be considered that a terminal or user equipment comprises radio circuitry and/control circuitry for wireless communication. Radio circuitry may comprise for example a receiver and/or transmitter and/or transceiver. Processing or control circuitry may include one or more controllers, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or processing or control circuitry. It may be considered that a terminal or user equipment is configured to be a terminal or user equipment adapted for LTE/E-UTRAN. Reference signaling in the uplink may be associated to a terminal, e.g. SRS.

A radio node (also referred to as network node or base station) may be any kind of radio node or base station of a wireless and/or cellular network adapted to serve one or more terminals or user equipments. It may be considered that a base station is a node or network node of a wireless communication network. A radio node or network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or radio node is adapted for one or more RATs, in particular LTE/E-UTRA. Radio circuitry may comprise for example a receiver and/or transmitter and/or transceiver. Processing or control circuitry may include one or more controllers, which may comprise a microprocessor and/or microcontroller and/or FPGA (Field-Programmable Gate Array) device and/or ASIC (Application Specific Integrated Circuit) device. It may be considered that processing and/or control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively or additionally, a cell may comprise at least one carrier for UL communication/transmission and DL communication/transmission, e.g., in TDD-based approaches.

A cell may be generally a communication cell, e.g., of a cellular or mobile communication network, provided by a node. A serving cell may be a cell on or via which a network node (the node providing or associated to the cell, e.g., base station or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

A cellular network or mobile or wireless communication network may comprise e.g., an LTE network (FDD or TDD), UTRA network, CDMA network, WiMAX, GSM network, any network employing any one or more radio access technologies (RATs) for cellular operation, e.g. NR. A cellular network or system may operate and/or be based on cells. The description herein is given for LTE, but it is not limited to the LTE RAT, but could also be applicable for LTE Evolution or Next Radio or any 5G technology. It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station or eNodeB, may be adapted to provide and/or define and/or control one or more cells, e.g., a PCell and/or a LA cell. Cellular DL operation and/or communication of a wireless device or UE may refer to receiving transmissions in DL, in particular in cellular operation and/or from a radio node/network node/eNB/base station. Cellular UL operation of a wireless device or UE may refer to UL transmissions, in particular in cellular operation, e.g. transmitting to a network or radio node/network node/eNB/base station.

An eNodeB (eNB) may be envisioned as an example of a network node or radio node or base station, e.g. according to an LTE standard. A gNB may be considered a radio node or network node or base station according to NR: A radio node may generally be any network node (node of the network) adapted for wireless communication, e.g. via an air interface and/or with one or more terminals. Examples of radio nodes comprise base stations, relay nodes, femto-, pico-, nano-, or micro-nodes, etc. A radio node or base station may generally be proximity service enabled and/or to provide corresponding services. It may be considered that a radio node base station is configured as or connected or connectable to an Evolved Packet Core (EPC) and/or to provide and/or connect to corresponding functionality. The functionality and/or multiple different functions of a radio node or base station may be distributed over one or more different devices and/or physical locations and/or nodes.

A radio node or base station may be considered to be a node of a wireless communication network. Generally, a radio node or base station may be considered to be configured to be a coordinating node and/or to allocate resources in particular for cellular communication between two nodes or terminals of a wireless communication network, in particular two user equipments.

Performing measurements may include measuring signaling, and/or performing processing based thereon, e.g. filtering, averaging, integrating, normalizing, scaling, weighting, determining and/or extracting and/or providing samples, etc. The latter may be based on, and/or performed by, a sample determining device, and/or be performed during measuring, or after, and/or while or before preparing a measurement report.

Reference signaling may comprise one or more reference signals or symbols. Reference signals may be adapted or intended for a receiver (e.g., a terminal) to perform measurements on and/or to provide a measurement report on. Reference signals may be defined by a standard, e.g. CSI-RS defined by 3GPP standards, e.g. LTE or NR. Measurement reporting and/or providing a measurement report may generally comprise transmitting a measurement report, in particular to a source/transmitter of reference signaling, e.g. a network node, and/or performing measurements, e.g. on reference signaling, and/or evaluating measurements (e.g., processing the measurement results). A measurement report may be based on the performed measurements and/or the evaluating. Generally, reference signaling may be cell-specific or terminal-specific. CSI-RS may be considered an example for terminal-specific or user-specific reference signaling.

Configuring (e.g., with or for a configuration) a device like a terminal or radio node or network node may comprise bringing the device into a state in accordance with the configuration. A device may generally configure itself, e.g. by adapting a configuration. Configuring a terminal, e.g. by a network node, may comprise transmitting a configuration or configuration data indicating a configuration to the terminal, and/or instructing the terminal, e.g. via transmission of configuration data, to adapt the configuration configured. Configuration data may for example be represented by broadcast and/or multicast and/or unicast data, and/or comprise downlink control information, e.g. DCI according to 3GPP standardization. Scheduling may comprise allocating resource/s for uplink and/or downlink transmissions, and/or transmitting configuration or scheduling data indicative thereof.

Resources or communication resources or radio resources may generally be frequency and/or time resources (which may be called time/frequency resources).

Resources may be represented by resource blocks or resource elements (RE), the latter of which may represent a smallest allocatable block of time/frequency resource and/or a subcarrier in frequency space and a symbol time length in time, e.g. as defined in an associated standard like NR or LTE.

Some useful abbreviations comprise:

| Abbreviation | Explanation |
| --- | --- |
| BBU | Baseband Unit |
| BLER | Block Error Rate |
| CFI | Control Format Indicator |
| CRS | Common Reference Symbols |
| DCI | Downlink Control Information |
| DL | Downlink |
| DFT | Discrete Fourier Transform |
| DMRS | Demodulation Reference Symbols |
| FDD | Frequency Division Duplex |
| FDMA | Frequency Division Multiple Access |
| FS | Frame Structure |
| HARQ | Hybrid Automatic Repeat Request |
| HTTP | Hypertext Transfer Protocol |
| MAC | Medium Access Control |
| MIB | Master Information Block |
| OFDM | Orthogonal Frequency Division Multiplexing |
| PUCCH | Physical Uplink Control Channel |
| PUSCH | Physical Uplink Shared Channel |
| RF | Radio Frequency |
| RRU | Remote Radio Unit |
| RRC | Radio Resource Control |
| SC | Single Carrier |
| SF | Subframe |
| SIB | System Information Block |
| sPUCCH | Short PUCCH |
| sPUSCH | Short PUSCH |
| sPDCCH | short Physical Downlink Control Channwel |
| sTTI | Short TTI |
| TA | Timing Advance |
| TCP | Transmission Control Protocol |
| TDD | Time Division Duplex |
| TTI | Transmission Time Interval |
| UE | User Equipment |
| UL | Uplink |

Configuring a, or by a, wireless device or UE may comprise setting one or more parameters and/or registers of the wireless device and/or tune and/or set one or more components or subsystems and/or circuitry, e.g. a control circuitry and/or radio circuitry, in particular to bring the wireless device into a desired operation mode, e.g. for transmitting and/or receiving data according to allocated resources and/or as scheduled by a network node and/or to be configured for communication via or with one or more cells of a cellular network and/or one or more than one D2D/ProSe enabled devices. A wireless device may be adapted for configuring itself, e.g. based on configuration and/or allocation data, which it may receive from a network or network node.

Each or any one of the wireless devices or user equipments described or shown may be adapted to perform the methods to be carried out by a user equipment or wireless device described herein. Alternatively or additionally, each or any of the wireless devices or user equipments shown in the figures may comprise any one or any combination of the features of a user equipment or wireless device described herein. Each or any one of the radio nodes or network nodes or controlling nodes or eNBs or base stations described or shown in the figures may be adapted to perform the methods to be carried out by a radio node or network node or base station described herein. Alternatively or additionally, the each or any one of the radio nodes or controlling or network nodes or eNBs or base stations shown in the figures may comprise any one or any one combination of the features of a radio node or network node or eNB or base station described herein.

In this description, for purposes of explanation and not limitation, specific details are set forth (such as particular network functions, processes and signalling steps) in order to provide a thorough understanding of the technique presented herein. It will be apparent to one skilled in the art that the present concepts and aspects may be practiced in other embodiments and variants that depart from these specific details. For example, the concepts and variants are partially described in the context of Long Term Evolution (LTE) or LTE-Advanced (LTE-A) or LTE Evolution or NR mobile or wireless or cellular communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

The invention claimed is:

1. A method for operating a user equipment in a cellular communication network, the method comprising:
   receiving a maximum timing advance parameter expected for any user equipment in a cell containing the user equipment from a network node as a broadcast parameter; and
   processing uplink, UL, signaling based on a processing timing, the processing timing being based on a timing advance value and a determined processing duration value determined by the user equipment, the determined processing duration value being based on the timing advance value and the maximum timing advance parameter received as a broadcast parameter from the network node; and
   receiving a maximum timing advance parameter for any user equipment in a cell containing the user equipment from a network node as a broadcast parameter.

2. The method according to claim 1, wherein two different ranges of timing advance values each associated with different processing duration values are assigned, based on which the processing duration value is determined.

3. The method according to claim 2, wherein the processing duration value is determined as a function of the timing advance value.

4. The method according to claim 1, wherein the processing duration value is determined as a function of the timing advance value.

5. A user equipment for a cellular communication network, the user equipment being configured to:
   receive a maximum timing advance parameter expected for any user equipment in a cell containing the user equipment from a network node as a broadcast parameter; and
   process UL signaling based on a processing timing, the processing timing being based on a timing advance value and a determined processing duration value determined by the user equipment, the determined processing duration value being based on the timing advance value and the maximum timing advance parameter received as a broadcast parameter from the network node.

6. The user equipment according to claim 5, wherein two different ranges of timing advance values each associated with different processing duration values are assigned, based on which the processing duration value is determined.

7. The user equipment according to claim 6, wherein the processing duration value is determined as a function of the timing advance value.

8. The user equipment according to claim 5, wherein the processing duration value is determined as a function of the timing advance value.

9. A method for operating a radio node in a cellular communication network, the method comprising:
   receiving a maximum timing advance parameter expected for any user equipment in a cell containing the user equipment from a network node as a broadcast parameter; and
   receiving uplink, UL, signaling based on a processing timing, the processing timing being based on a timing advance value and a determined processing duration value determined by the user equipment, the determined processing duration value being based on the timing advance value and the maximum timing advance parameter received as a broadcast parameter from the network node.

10. The method according to claim 9, wherein two different ranges of timing advance values each associated with different processing duration values are assigned, based on which the processing duration value is determined.

11. The method according to claim 10, wherein the processing duration value is determined as a function of the timing advance value.

12. The method according to claim 9, wherein the processing duration value is determined as a function of the timing advance value.

13. A radio node for a cellular communication network, the radio node being configured to:
   receive a maximum timing advance parameter expected for any user equipment in a cell containing the user equipment from a network node as a broadcast parameter; and
   receive uplink, UL, signaling based on a processing timing, the processing timing being based on a timing advance value and a determined processing duration value determined by the user equipment, the determined processing duration value being based on the timing advance value and the maximum timing advance parameter received as a broadcast parameter from the network node.

14. The radio node according to claim 13, wherein two different ranges of timing advance values each associated with different processing duration values are assigned, based on which the processing duration value is determined.

15. The radio node according to claim 14, wherein the processing duration value is determined as a function of the timing advance value.

16. The radio node according to claim 13, wherein the processing duration value is determined as a function of the timing advance value.

17. A non-transitory computer storage medium storing computer executable instructions, the instructions causing processing circuitry to at least one of perform and control a method for operating a user equipment in a cellular communication network, the method comprising:
   receiving a maximum timing advance parameter expected for any user equipment in a cell containing the user equipment from a network node as a broadcast parameter; and
   processing uplink, UL, signaling based on a processing timing, the processing timing being based on a timing advance value and a determined processing duration value determined by the user equipment, the determined processing duration value being based on the timing advance value and the maximum timing advance parameter received as a broadcast parameter from the network node.

* * * * *